Aug. 18, 1970  HIDEO IMAI  3,524,515

SCRAPER VEHICLE

Filed March 25, 1968

INVENTOR.
HIDEO IMAI

United States Patent Office 3,524,515
Patented Aug. 18, 1970

3,524,515
SCRAPER VEHICLE
Hideo Imai, Tokyo, Japan, assignor to Mitsubishi Jokogyo Kabushiki Kaisha, Tokyo, Japan
Filed Mar. 25, 1968, Ser. No. 718,979
Claims priority, application Japan, Apr. 22, 1967 42/25,739
Int. Cl. B62d 5/00
U.S. Cl. 180—79.2     2 Claims

ABSTRACT OF THE DISCLOSURE

A ground scraper vehicle construction includes a front chassis and a rear chassis pivotally connected to the front chassis. Each of the chassis carries respective ground wheels at each end of a single axis on each chassis element. The rear chassis is pivotally connected to the forward chassis, and steering of the vehicle may be effected by the controlled pivoting of the forward chassis relative to the rear chassis. Each chassis is constructed so that a ratio of the total chassis weight to the total projected area of the ground-engaging tires fall within a range of from 0.4 to 0.7 kg./cm.$^2$.

SUMMARY OF THE INVENTION

This invention relates in general to the construction of an earth-moving vehicle, and in particular to a new and useful ground scraper having two separate chassis portions, each of which is individually driven from its own motor and wherein the overall vehicle is steered by pivoting the forward chassis relative to the rear chassis.

A vehicle or motor scraper is a device for conveying earth and sand, for example, when forming a new road bed or reparing an old road bed. In both cases where the ground is damp and the soil is soft, vehicles of this type have difficulty in proceeding without slipping. In some instances, the tires become stuck in the mud and it is not even possible to move the vehicle, but in many instances the motor scraper cannot operate at normal efficiency.

In accordance with the present invention there is provided a new construction of road scraper which includes a forward and a rear chassis which are pivotally connected together. The construction is such that steering of the vehicle is accomplished by pivoting the forward chassis relative to the rear chassis. Ground-engaging wheels are provided at both ends of separate single axles provided on each chassis. Each set of wheels is driven from its own motor which is also mounted on the respective chassis directly above the wheel axle. The vehicle wheel or tire sizes are such that a ratio of the total chassis weight of the total projected area of the tires is within the range of from 0.4 to 0.7 kg./cm.$^2$.

Accordingly, it is an object of the invention to provide an improved ground scraper vehicle having two chassis with the steering being accomplished by pivoting the forward chassis relative to the rear chassis and wherein each chassis includes its own engine for driving an associated chassis axle with two ground-engaging wheels, and wherein the ground engaging wheels are constructed so that a ratio of the total chassis weight to the total projected area of the tires fall within the range of 0.4 to 0.7 kg./cm.$^2$.

A further object of the invention is to provide a ground scraper vehicle which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENTS

Figure 1:
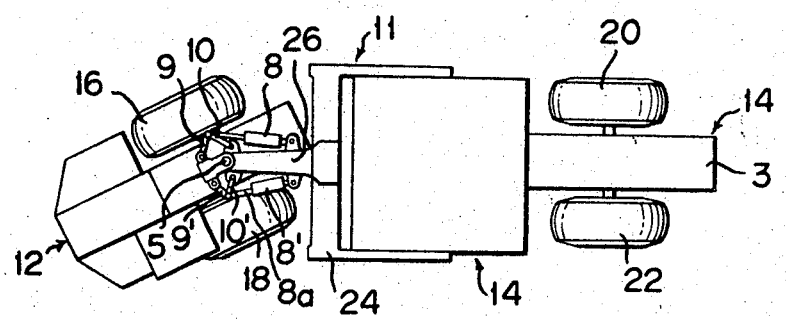
FIG. 1 is a top plan view of a motor scraper constructed in accordance with the invention.
Figure 2:
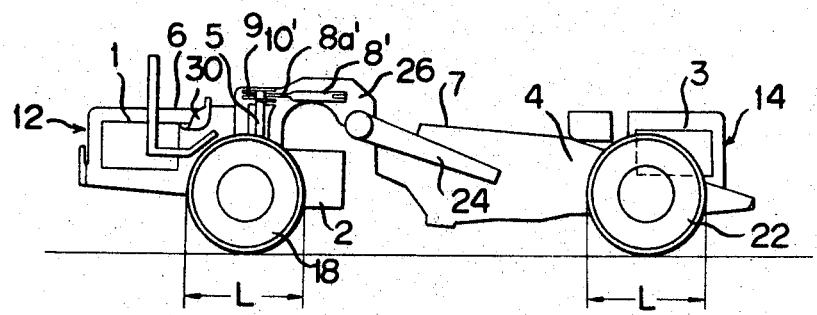
FIG. 2 is a side elevational view of the scraper indicated in FIG. 1.
Figure 3:
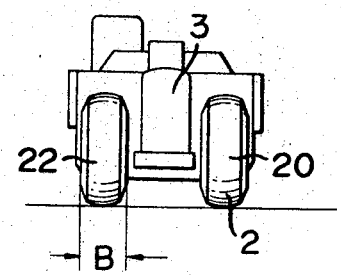
FIG. 3 is a rear elevational view.

Referring to the drawings in particular, the invention embodied therein comprises a motor scraper generally designated 11 which includes a forward chassis generally designated 12 and a rear chassis generally designated 14. A front engine 1 is mounted on the chassis 12 in a position to drive ground engaging wheels 16 and 18 on respective ends of a single axle and through power transmission means located directly beneath the engine. The rear chassis 14 is provided with a rear engine 3 which drives ground engaging wheels 20 and 22 through suitable transmission means (not shown). A body portion 2 of the forward chassis 12 mounts a vertical pivot pin 5 about which the rear chassis 14 pivots. The rear chassis 14 includes a body portion 7 which is equipped with the necessary scraping equipment (not shown), and it is supported on a yoke 24 having a forward arm portion 26 which is pivoted on the pivot pin 5. The forward chassis 12 and the rear chassis 14 carry rigid link elements 9, 9', 10 and 10' which are supported around the pin 5 and the respective end of the link elements 9, 9', 10 and 10' are engaged by piston rod elements 8a, 8a' of respective steering control cylinders 8 and 8'. Steering may be effected by an operator sitting in a seat 30 of the forward chassis 12 to operate a suitable control which directs a fluid under pressure to or from the associated cylinders 8 and 8' to effect the desired pivotal movement of the forward chassis 12 relative to the rear chassis 14 and hence to execute a turning movement of the vehicle.

The vehicle is constructed such that the outer diameter of wheels 16 and 18 and 20 and 22 (which is indicated by the letter L) and the width (which is indicated by the letter B) of each wheel and the total weight of the chassis (which is indicated by the letter W) are maintained within a predetermined ratio. The ratio is advantageously chosen such that the total weight of the chassis with respect to the projected area of the four tires is shown in the form of an equation $W/4(B)(L)$. This value is kept within the range of 0.4–0.7 kg./cm.$^2$ in order to improve the operation of the vehicle over the soft ground.

It should be appreciated that the values for the existing road scrapers have usually been maintained over 1.0 kg./cm.$^2$. With the invention construction, an excellent driving characteristic may be obtained over slippery or soft ground and it is possible to perform the motor scraping operation with high efficiency.

Because all engines are mounted on the respective front and rear chassis over the respective axle and wheel sets, the frictional force working between all the ground wheels and the ground is most effectively used. Thus, even when one of the wheels falls into a very muddy portion so that it does slip, the remaining wheels will provide sufficient frictional engagement for propelling the vhicle in a substantially uniform manner. A further operating efficiency is obtained by using two separate chassis which are pivoted to each other and may be manipulated about the pivotal connection for the purpose of steering. This permits steering of the vehicle so that it may be manipulated away from the area in which one of the wheels becomes stuck in the soft ground. By maintaining the proper ratio between the total weight of the vhicle and the tire area, it is also assured that the operating stability of the vehicle will be maintained easily under most operating conditions.

While a specific embodiment of the invention has been shown and described in detail to illustrate the application of the inventive principles, it will be understood that the invention may be embodied otherwise without departing from such principles.

What is claimed is:

1. A motor scraper comprising a forward chassis, a rear chassis pivotally connected to said forward chassis, each of said forward and rear chassis having an axle with a wheel adjacent each end for supporting the chassis for movement over the ground, a forward driving engine on said forward chassis connected to drive said wheels on said forward chassis, a rear driving engine on said rear chassis connected to drive said rear wheels on said rear chassis, and steering means carried on one of said chassis for pivoting this chassis in respect to the other of said chassis, the ratio of the total chassis weight of said forward and said rear chassis to the total projected area of said wheels falling within the range of about from 0.4 to 0.7 kg./cm.$^2$, said steering means comprising a cross member rigidly mounted on one of said chassis and pivoted about said pivotal connection between said forward and rear chassis, and ffuid piston means connected to said cross member to pivot said member about said pivot to effect steering of said vehicle.

2. A motor scraper including a forward chassis, a rear chassis pivotally connected to said forward chassis, means for pivoting said chassis relative to each other, each of said forward and rearward chassis having an axle with a wheel adjacent each end for supporting said chassis for movement over the ground, the ratio of the total chassis weight of said forward and said rear chassis to the total projected area of said wheels of each of said chassis falling within the range of about from 0.4 to 0.7 kg./cm.$^2$.

References Cited

UNITED STATES PATENTS

| | | | |
|---|---|---|---|
| 2,347,882 | 5/1944 | Choate et al. | 180—79.2 |
| 2,638,998 | 5/1953 | Rockwell | 180—79.2 |
| 3,205,962 | 9/1965 | Anderson | 280 |

BENJAMIN MERSH, Primary Examiner

J. A. PEKAR, Assistant Examiner